Figure 1:
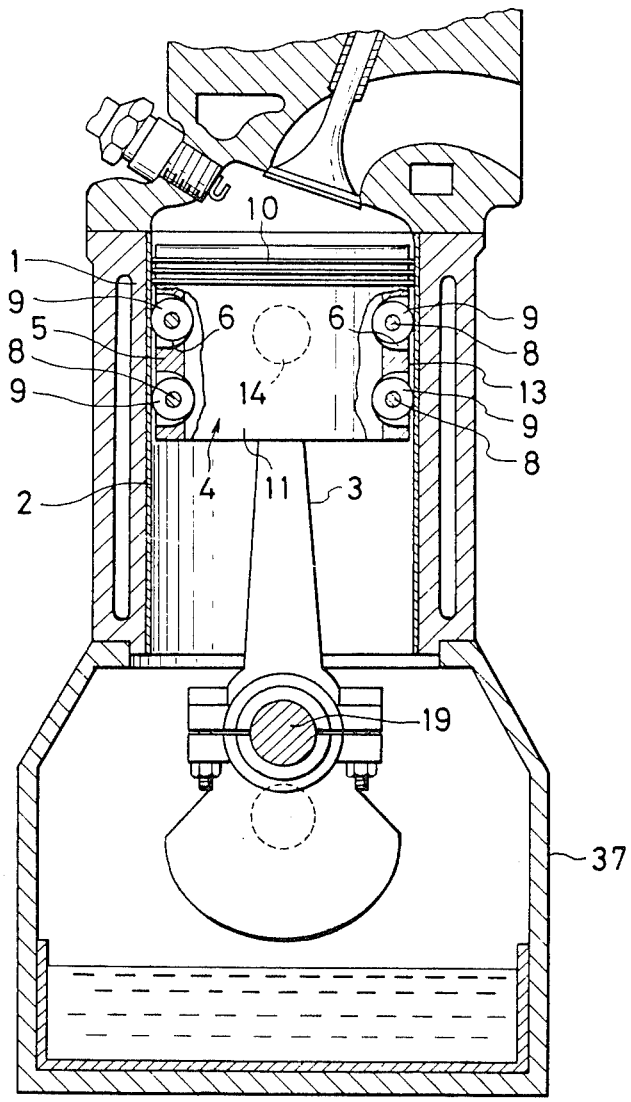

United States Patent [19]

Bando

[11] Patent Number: 4,485,728
[45] Date of Patent: Dec. 4, 1984

[54] RECIPROCATING MACHINE

[75] Inventor: Shigeru Bando, Tokushima, Japan

[73] Assignee: Bando Kiko Co., Ltd., Tokushima, Japan

[21] Appl. No.: 433,145

[22] Filed: Oct. 6, 1982

[30] Foreign Application Priority Data

Oct. 12, 1981 [JP] Japan .................. 56-163197
Nov. 21, 1981 [JP] Japan .................. 56-187174
Dec. 19, 1981 [JP] Japan .................. 56-205679
May 12, 1982 [JP] Japan .................... 57-69860

[51] Int. Cl.³ .................. F16J 1/02; F16C 29/04
[52] U.S. Cl. .................. 92/178; 308/4 R; 308/6 R
[58] Field of Search .......... 92/178; 308/6 R, 6 A, 308/6 B, 6 C, 4 R, 207 A, 207 R, 184 R, 184 A, 206; 403/146, 147, 162

[56] References Cited

U.S. PATENT DOCUMENTS

| 632,950 | 12/1899 | Spence et al. ............. 92/178 |
| 2,328,918 | 9/1943 | McManus ............... 308/6 R |
| 3,398,653 | 8/1968 | Foster ................... 92/178 |

FOREIGN PATENT DOCUMENTS

| 183938 | 2/1906 | Fed. Rep. of Germany . |
| 447475 | 7/1927 | Fed. Rep. of Germany . |
| 938521 | 1/1956 | Fed. Rep. of Germany . |
| 0055074 | 6/1951 | France .................. 92/178 |
| 128622 | 10/1980 | Japan . |
| 217312 | 6/1924 | United Kingdom . |
| 349213 | 5/1931 | United Kingdom . |
| 479967 | 2/1938 | United Kingdom . |
| 703402 | 2/1954 | United Kingdom . |

OTHER PUBLICATIONS

Japanese Utility Model Application 68011.

*Primary Examiner*—Robert E. Garrett
*Assistant Examiner*—H. Edward Li
*Attorney, Agent, or Firm*—Oblon, Fisher, Spivak, McClelland & Maier

[57] ABSTRACT

A reciprocating engine comprising a cylinder, a piston performing reciprocating movement within the cylinder, a crank shaft performing rotational movement, a connecting rod connected rotatably at its one end to the crank shaft and at its the other end to the piston, and rollers each mounted on the side portion of the piston, in which the piston is in rolling contact with the cylinder through the rollers.

22 Claims, 8 Drawing Figures

RECIPROCATING MACHINE

This invention relates to a reciprocating machine with reduced frictional resistance between a piston and a cylinder.

Reciprocating machines such as reciprocating engines, reciprocating compressors or reciprocating pumps are well-known.

In a reciprocating machine, for example, a reciprocating engine, a connecting rod that connects a piston with a crank shaft performs lateral oscillating movements during reciprocating movements of piston within a cylinder in order to transmit the rotational force to the crank shaft, then, side thrust of the piston due to the lateral oscillating movements of the connecting rod is applied to the cylinder. The side thrust is exerted from the outer circumferential surface of the piston to the inner circumferential surface of the cylinder on a plane defined by the lateral oscillating movements of the connecting rod. Thus, the action of the side thrust induces a considerable frictional contact between the inner circumferential surface of the cylinder and the outer circumferential surface of the piston thereby resulting in rather large loss of friction.

In order to prevent such loss of friction caused from the action of the side thrust, various counter measures have been employed such as by offsetting the piston pin that connects the piston and the connecting rod or minimizing the gap between the piston and the cylinder as much as possible but none of them provide effective decrease in the loss of friction.

This invention has been made in view of the foregoing problems and it is an object of this invention to provide a reciprocating machine capable of ensuring the reduction in the frictional resistance between the inner circumferential surface of the cylinder and the outer circumferential surface of the piston, thereby substantially decreasing the loss of friction.

The reciprocating machine according to this invention comprises a support, a reciprocating member performing reciprocating movement within the support, a crank shaft performing rotational movement, a connecting rod connected rotatably at its one end to the crank shaft and at its the other end to the reciprocating member and rolling means mounted on the side portion of the reciprocating member, in which the reciprocating member is in rolling contact with the support through the rolling means.

Accordingly, in the reciprocating machine of this invention, since the reciprocating member is in rolling contact with the support through the rolling means, the frictional resistance between the support and the reciprocating member can surely be reduced thereby enabling a substantial decrease in the loss of friction.

In this invention, the reciprocating member may be a piston or a cross head as an auxiliary piston interconnecting with the piston and the support may be a cylinder in which the piston reciprocates or a support member in which the cross head reciprocates.

This invention may be applied a reciprocating engine, a reciprocating compressor, a reciprocating pump or the like.

Figure 2:
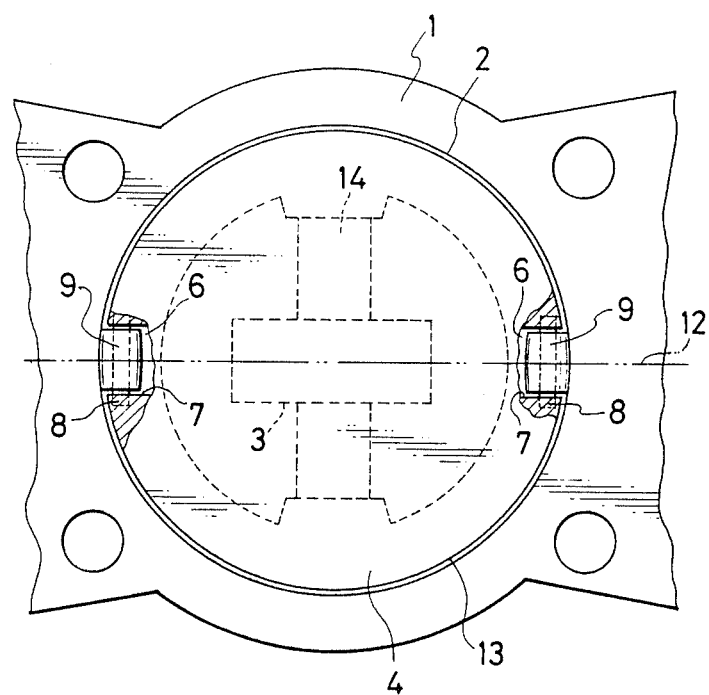
Figure 3:
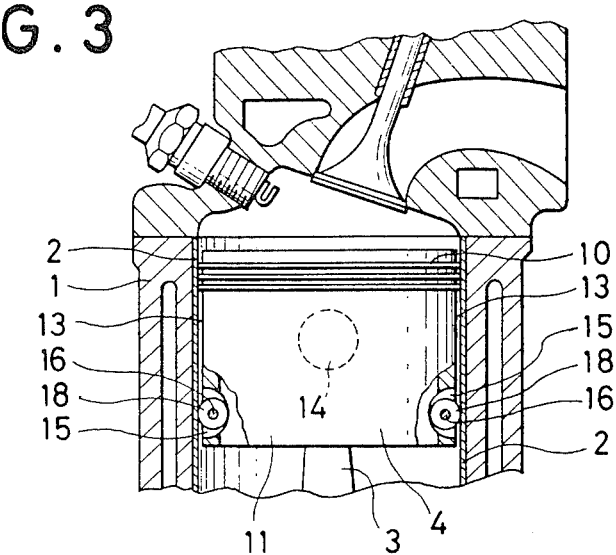
Figure 4:
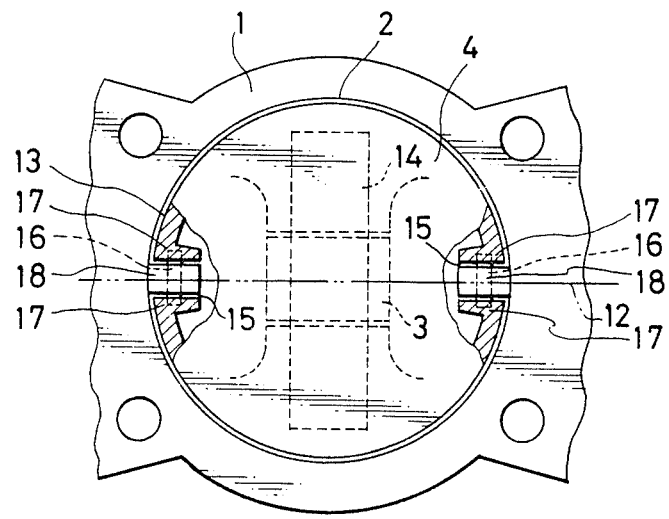
Figure 5:
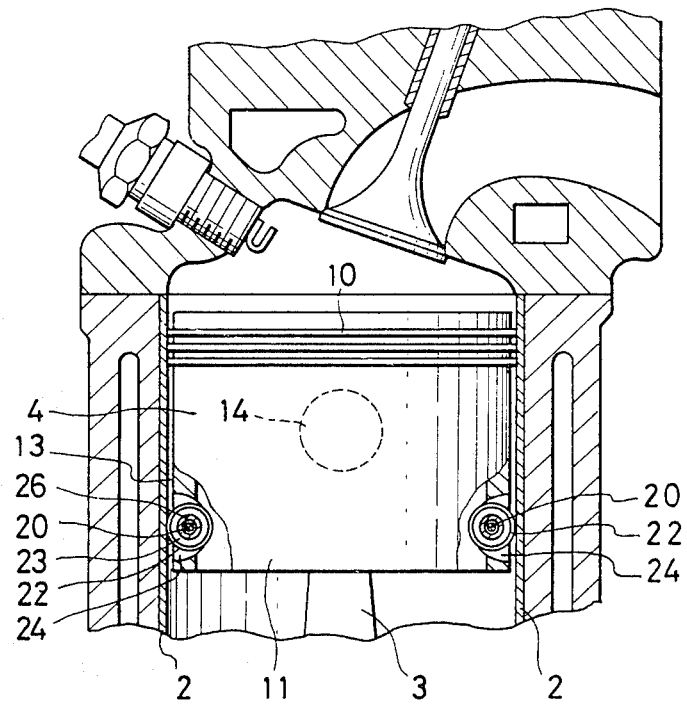
Figure 6:
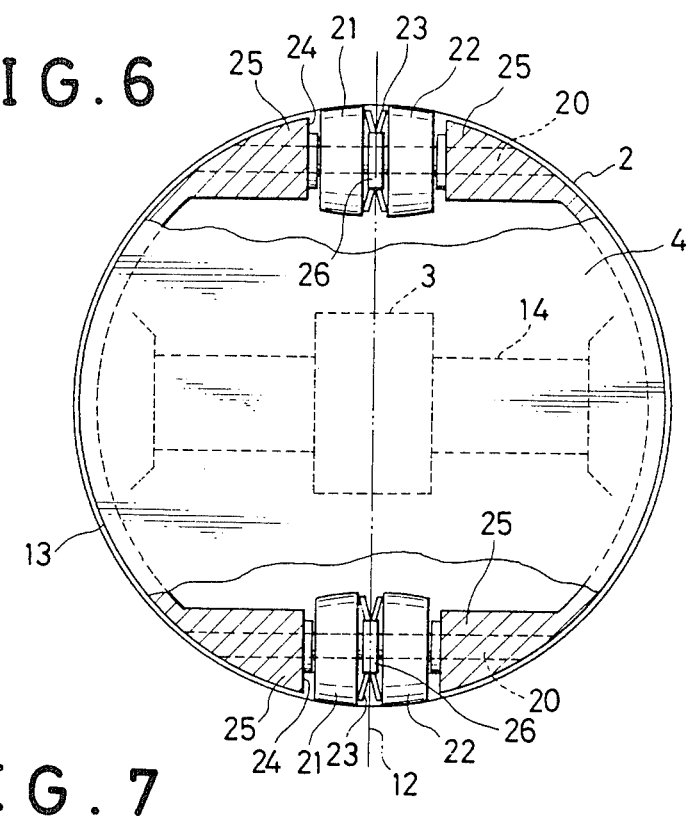
Figure 7:
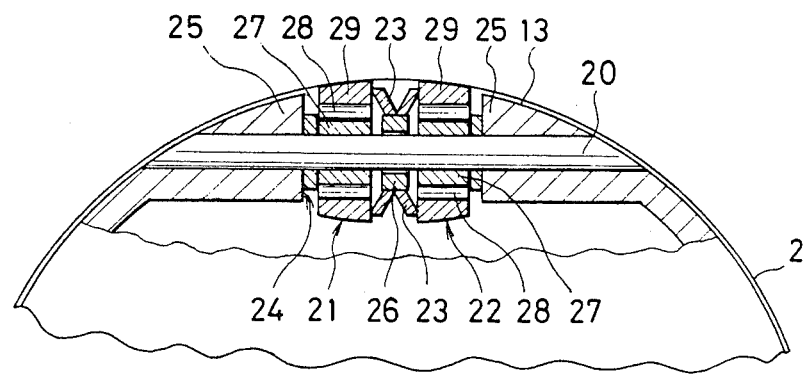
Figure 8:
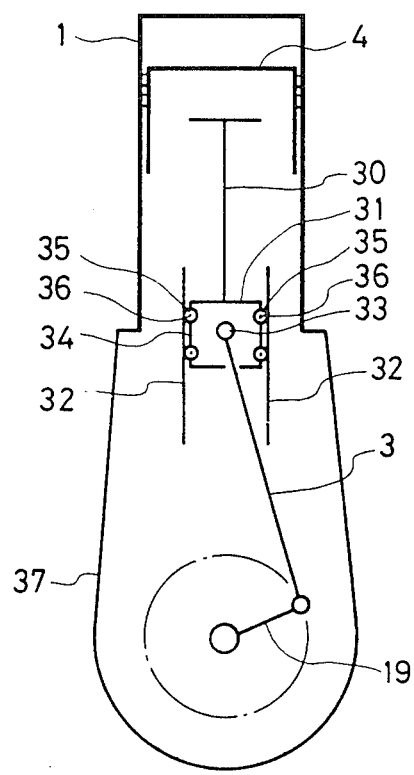

This invention will now be explained by way of preferred embodiments of a reciprocating machine which is not necessarily limited only to a reciprocating engine to be illustrated and described specifically hereinafter but includes a reciprocating compressor and a reciprocating pump as well, wherein, FIG. 1 is a longitudinal sectional view of a preferred embodiment of this invention, in which a piston is partially shown in cross section, FIG. 2 is a plan view of the reciprocating engine shown in FIG. 1 with a cylinder head being removed, in which a piston is partially shown in cross section, FIG. 3 is a longitudinal sectional view of a part of another embodiment of the reciprocating engine according to this invention, in which a piston is partially shown in cross section, FIG. 4 is a plan view of the reciprocating engine shown in FIG. 3 with a cylinder head being removed, in which a piston is partially shown in cross section, FIG. 5 is a longitudinal sectional view of a further embodiment according to this invention, in which a piston is partially shown in cross section, FIG. 6 is a plan view of the reciprocating engine shown in FIG. 5 with a cylinder head being removed, in which a piston is partially shown in cross section, FIG. 7 is an enlarged cross sectional view of a part of the piston shown in FIG. 6, and FIG. 8 is an explanatory view of a still further embodiment according to this invention.

Numeral 1 is a cylinder as the support. Numeral 2 is a cylinder liner or an inner wall of the cylinder 1. Numeral 3 is a connecting rod. Numeral 4 is a piston as the reciprocating member. The piston 4 is provided with openings 6 at the side portion 5 thereof. The openings 6 are arranged on the actuation plane of the connecting rod 3, that is, on a plane 12 defined by the lateral oscillating movements of the connecting rod 3 (shown by the dotted chain line in FIG. 2) each by two, at upper and lower positions on both sides of the piston 4. In each of the four openings 6, a roller 9 as rolling means is rotatably mounted on the piston 4 through a pin 8, each end of the pin 8 secured to the side wall 7 of the opening 6. Each of the rollers 9 is arranged at a skirt area 11 of the piston 4 below piston rings 10 where the side thrust of the piston 4 is applied by way of the inner wall 2. Each of the rollers 9 is slightly projected radially out of the outer circumferential surface 13 of the piston 4 and in rolling contact with the inner wall 2 of the cylinder 1. Each of the rollers 9 comprises a rolling bearing such as a ball bearing, needle bearing or roller bearing and the cross sectional profile of the roller 9 in the axial direction of the pin 8 has an arcuate shape corresponding to the configuration of the inner circumferential surface of the inner wall 2. Each of the rollers 9 has reliable durability for impact load or violent force of inertia and exceeding heat. The connecting rod 3 is connected pivotably at its one end to the crank shaft 19 and at its other end to the piston 4 through the piston pin 14. Numeral 37 is crank casing. The lubricant is supplied to the rollers 9, the outer circumferential surface 13 of the piston 4, the inner wall 2 and piston pin 14, respectively while the piston 4 reciprocates within the cylinder 1.

In the reciprocating engine having the foregoing structure, the piston 4 reciprocates within the cylinder 1, while the connecting rod 3 repeats the lateral oscillating movements on the plane 12, by which the side thrust of the piston 4 is exerted on the inner wall 2 of the cylinder 1. In this embodiment, since a plurality of rollers 9 are mounted on the side portion 5 of the piston 4 on the plane 12 and the rollers 9 are respectively in rolling contact with the inner wall 2, each of the rollers 9 effectively prevents the outer circumferential surface 13 of the piston 4 from coming in considerable frictional contact with the inner wall 2 of the cylinder 1 due to the action of the side thrust of the piston 4, thereby enabling to reduce the frictional resistance between the outer circumferential surface 13 and the inner wall 2 and thus provide a substantial decrease in the loss of friction.

As the result of the road test actually carried out on an automobile on which the reciprocating engine of this invention is mounted, the fuel cost can indeed be economized significantly.

FIG. 3 and FIG. 4 illustrate another embodiment of this invention, in which same components as those in the previous embodiment carry the same numeral. In this embodiment the piston 4 is provided with two openings 15 at the side portion thereof, each of the openings 15 arranged on the plane 12 defined by the lateral oscillating movement of the connecting rod 3 (shown by the dotted chain line in FIG. 4), at the skirt area 11 of the piston 4, the preferred position of the openings 15 being slightly below than that of the piston pin 14. In each of the openings 15, a pin 16 extending in the axial direction of the piston pin 14 is secured at both ends thereof to the side walls 17 of the opening 15 and a roller 18 as rolling means is rotatably mounted on the pin 16. Each of the rollers 18 is slightly projected outwardly from the outer circumferential surface 13 of the piston 4 and adapted to be in rolling contact with the inner wall 2 of the cylinder 1. The roller 18 comprises a ball bearing, a needle bearing or a roller bearing having reliable durability for impact load or violent force of inertia and exceeding heat.

FIG. 5, FIG. 6 and FIG. 7 illustrate a further embodiment in which the same components as those in the previous embodiments carry the same numeral. In this embodiment, each of the rolling means comprises a pin 20, a pair of rollers 21 and 22 rotatably mounted on the pin 20 and a plurality of leaf springs 23 as resilient biasing means rotatably mounted on the pin 20 between the rollers 21 and 22. Two openings 24 are formed in the circumferential wall of the skirt area 11 of the piston 4 on the plane 12 (shown by the dotted chain line in FIG. 6) and each of the pins 20 is fixed at its both ends to the side walls 25 of the opening 24. The pin 20 is extended in the axial direction of the piston pin 14 and the rollers 21, 22 and a leaf spring retainer 26 are rotatably mounted on the outer circumferential surface of the pin 20. Each of the rollers 21 and 22 comprises a needle bearing or a roller bearing having an inner ring 27, rolling elements 28 and an outer ring 29. The inner ring 27 is secured to the outer circumferential surface of the pin 20. The inner ring 27 and the outer ring 29 are rotated relative to each other through the rolling elements 28 and also moved relative to each other through the rolling element 28 in the axial direction of the pin 20. The leaf spring retainer 26 is rotatable on the pin 20. A plurality of leaf springs 23 are retained, each at their one end to the retainer 26 and urge, by their other ends, the outer rings 29 of the rollers 21 and 22 outwardly in the axial direction of the pin 20. The retainer 26 and the leaf springs 23 are rotated integrally with the outer rings 29. The cross sectional profile of each of the outer rings 29 of the rollers 21 and 22 in the axial direction of the pin 20 has an arcuate shape corresponding to the configuration of the inner circumferential surface of the inner wall 2 and the outer rings 29 are in rolling contact at a relatively wide range with the inner wall 2. Each of the outer rings 29 of the rollers 21 and 22 slightly projected from the outer circumferential surface 13 of the piston 4 and resiliently biased outwardly in the axial direction of the pin 20 by the leaf springs 23 and urged to the inner wall 2 of the cylinder 1. Accordingly, the rollers 21 and 22 can surely be rolled on the inner wall 2 during reciprocation of the piston 4 and kept in rolling contact with the inner wall 2 even when exerted with a violent impact load through the piston 4 and the cylinder 1. Further, the rollers 21 and 22 can receive, owing to the resiliency of the leaf springs 23, the load from the inner wall 2 exerted as the reaction of the side thrust and the thermal expansion of the piston 4, thereby enabling to effectively maintain the rolling contact with the cylinder liner 2. Thus, they can effectively inhibit the considerable frictional contact between the outer circumferential surface 13 of the piston 4 and the inner wall 2 to enable a substantial reduction in the frictional resistance between the outer circumferential surface 13 and the inner wall 2. Further, they can effectively prevent undesired phenomena such as scratches caused to the inner circumferential surface of the inner wall 2.

The leaf springs 23 may be substituted with a pair of belleville springs.

FIG. 8 illustrates a still further embodiment of this invention, in which the same components as those in the previous embodiments carry the same references. In this embodiment, a cross head 31 is connected through a piston rod 30 to a piston 4 that reciprocates within a cylinder 1 and the cross head 31 reciprocates within a support member 32 as support. The connecting rod 3 is connected at its one end pivotably through a pin 33 to the cross head 31 and connected at its the other end pivotably to the crank shaft 19. Rollers 35 as rollings means are rotatably mounted respectively through pins 36 on the side portion 34 of the cross head 31 on the plane defining the lateral oscillating movements of the connecting rod 3, the plane corresponding to the plane 12 in the previous embodiment. The rollers 35, four in total, are provided respectively at the upper and the lower positions of the pin 33 on both sides of the cross head 31. Each of the rollers 35 is adapted to be in rolling contact respectively with the support member 32 so as to inhibit the considerable frictional contact between the cross head 31 and the support member 32. Each of the pins 36 is extended along the axial direction of the pin 33 and secured at both pin ends to the side walls of recess or opening provided on the side portion 34 of the cross head 31. Each of the rollers 35 rotatably mounted on the pin 36 comprises a ball bearing, a roller bearing or a needle bearing, the outer circumferential surface of which is slightly projected out of the side portion 34 of the cross head 31. The support member 32 is supported on the cylinder 1 or the crank casing 37. Instead of the rolling means mounted to the side portion 5 of the piston 4 in the previous embodiments, the rollers 35 as the rolling means are mounted to the cross head 31 as an auxiliary piston interconnecting with the piston 4 in this embodiment. This embodiment is particularly suitable to a reciprocating engine in which the piston 4 thermally expands in a relatively large extent and the side thrust is heavy, for instance, a large-scaled diesel engine or the like. However, each of the previous embodiments shown in FIG. 1–FIG. 7 may also be applied to the engine as shown in FIG. 8, for example the piston 4 is connected through a piston rod to a cross head as an auxiliary piston, which reciprocates within a support member, the cross head and the crank shaft are connected through a connecting rod, so that the reciprocation of the cross head may be converted into the rotational movement of the crank shaft. By providing rolling means to the cross head also in this case, so that the side thrust of the cross head may be applied through the rolling means to the support member, the frictional resistance between the cross head and the support member can be reduced effectively to result in the effective reduction in the frictional resistance between the piston and the cylinder to thereby provide a substantial decrease in the loss of friction.

Although the explanations have been made in each of the previous embodiments where this invention is applied to the reciprocating engine, this invention is not limited only to such embodiments but may also be applicable to other reciprocating machines such as a reciprocating compressor, a reciprocating pump or the like. For instance, in the case of a reciprocating compressor or a reciprocating pump, the same rolling means as shown in FIGS. 1 and 2, FIGS. 3 and 4 or FIG. 5 to FIG. 7 may be mounted on the side portion of the piston, so that the piston may be in rolling contact with the cylinder through the rolling means during reciprocation of the piston within the cylinder. Alternatively, the rolling means as shown in FIG. 8 may be mounted on the cross head as the auxiliary piston interconnecting with the piston, so that the cross head may be in rolling contact with the support member through the rolling means during reciprocation of the cross head within the support member. The rolling means in these cases may comprise the rollers 9 as shown in FIG. 2, the rollers 18 as shown in FIG. 4 or paired rollers 21 and 22 as shown in FIG. 7.

What is claimed is:

1. A reciprocating machine comprising a support, a reciprocating member performing reciprocating motion in the support, a crank shaft performing rotary motion, a connecting rod connected rotatably at its one end to said crank shaft and at its other end to the reciprocating member, and rolling means mounted on a side portion of the reciprocating member on a plane defined by the oscillating movement of the connecting rod, the rolling means comprising a pin, a pair of rollers rotatably mounted on the pin, and biasing means mounted on the pin between the rollers for resiliently urging the rollers away from each other along the axial direction of the pin, the rollers being in rolling contact with the support.

2. The reciprocating machine of claim 1, in which each roller of the pair of rollers is arranged along the direction perpendicular to the plane defined by the oscillating movement of the connecting rod.

3. The reciprocating machine of claim 1 or 2, in which said reciprocating member has an opening disposed on a side of a skirt portion of said reciprocating member, the pin being mounted in said opening and extending in a direction perpendicular to the plane defined by the oscillating movement of said connecting rod.

4. The reciprocating machine of claim 3, in which said opening is disposed in plurality along the axial direction of the reciprocating member.

5. The reciprocating machine of claim 1 or 2, in which the cross sectional profile of the rollers, in the axial direction of the pin, corresponds in its shape to the configuration of the inner circumferential surface of the support.

6. The reciprocating machine of claim 1 or 2, in which the reciprocating member constitutes a piston and the support constitutes a cylinder.

7. The reciprocating machine of claim 1 or 2, in which each of said rollers comprises a roller bearing, an outer ring of said roller bearing has a cross-sectional profile corresponding to the configuration of the inner circumferential surface of said support with respect to the axial direction of the pin, said outer ring is axially movable to said pin, and said biasing means resiliently urges said outer rings away from each other in the axial direction of said pin.

8. The reciprocating machine of claim 1 or 2, in which said roller comprises a needle bearing, an outer ring of said needle bearing has a cross-sectional profile corresponding to the configuration of the inner circumferential surface of said support with respect to the axial direction of the pin, said outer ring is axially movable to said pin, and said biasing means resiliently urges said outer rings away from each other in the axial direction of said pin.

9. The reciprocating machine of claim 1 or 2, in which said biasing means comprises a plurality of leaf springs.

10. The reciprocating machine of claim 1 or 2, in which said biasing means comprises a plurality of belleville springs.

11. The reciprocating machine of claim 1 or 2, in which said biasing means comprises a plurality of coned disc springs.

12. A reciprocating machine comprising a support, a reciprocating member performing reciprocating motion in the support, a crank shaft performing rotary motion, a connecting rod connected rotatably at its one end to said crank shaft and at its other end to the reciprocating member, and rolling means mounted on both side portions of the reciprocating member on a plane defined by the oscillating movement of the connecting rod, the rolling means respectively comprising a pin, a pair of rollers rotatably mounted on the pin, and biasing means freely mounted on the pin between the rollers for resiliently urging the rollers away from each other along the axial direction of the pin, the rollers being in rolling contact with the support to carry out rolling contact between the support and the reciprocating member.

13. The reciprocating machine of claim 12, in which each roller of the pair of rollers is arranged along a direction perpendicular to the plane defined by the oscillating movement of said connecting rod.

14. The reciprocating machine of claim 12 or 13, in which said reciprocating member has openings disposed on opposite sides of a skirt portion thereof, the pin being respectively mounted in each of said openings and extending in a direction perpendicular to the plane defined by the oscillating movement of said connecting rod.

15. The reciprocating machine of claim 14, in which said openings are disposed in plurality along the axial direction of the reciprocating member.

16. The reciprocating machine of claim 12 or 13, in which the cross sectional profile of the rollers, in the axial direction of the pin, corresponds in its shape to the configuration of the inner circumferential surface of the support.

17. The reciprocating machine of claim 12 or 13, in which the reciprocating member constitutes a piston and the support constitutes a cylinder.

18. The reciprocating machine of claim 12 or 13 in which each of said rollers comprises a roller bearing, an outer ring of said roller bearing has a cross-sectional profile corresponding to the configuration of the inner circumferential surface of said support with respect to the axial direction of the pin, said outer ring is axially movable to said pin, and said biasing means resiliently urges said outer rings away from each other in the axial direction of said pin.

19. The reciprocating machine in claim 12 or 13, in which each of said rollers comprises needle bearing, an outer ring of said needle bearings has a cross-sectional profile corresponding to the configuration of the inner circumferential surface of said support with respect to the axial direction of the pin, said outer ring is axially movable to said pin, and said biasing means resiliently urges said outer rings away from each other in the axial direction of said pin.

20. The reciprocating machine of claim 12 or 13, in which said biasing means comprises a plurality of leaf springs.

21. The reciprocating machine of claim 12 or 13, in which said biasing means comprises a plurality of belleville springs.

22. The reciprocating machine of claim 12 or 13, in which said biasing means comprises a plurality of coned disc springs.

* * * * *